US012313246B2

(12) United States Patent
Taylor et al.

(10) Patent No.: US 12,313,246 B2
(45) Date of Patent: May 27, 2025

(54) PORTABLE NECK LIGHT

(71) Applicant: MILWAUKEE ELECTRIC TOOL CORPORATION, Brookfield, WI (US)

(72) Inventors: Alexis R. Taylor, McFarland, WI (US); Benjamin D. Gall, Milwaukee, WI (US); Dalton F. Hansen, Grafton, WI (US); Sullivan Dee, West Allis, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/627,905

(22) Filed: Apr. 5, 2024

(65) Prior Publication Data

US 2024/0337370 A1 Oct. 10, 2024

Related U.S. Application Data

(60) Provisional application No. 63/457,965, filed on Apr. 7, 2023.

(51) Int. Cl.
*F21V 21/084* (2006.01)

(52) U.S. Cl.
CPC .................................. *F21V 21/084* (2013.01)

(58) Field of Classification Search
CPC ..................................................... F21V 21/084
See application file for complete search history.

(56) References Cited

U.S. PATENT DOCUMENTS

| | | | |
|---|---|---|---|
| 2,555,871 | A | 6/1951 | Caggiano |
| 3,731,084 | A | 5/1973 | Trevorrow |
| 3,830,230 | A | 8/1974 | Chester |
| 5,385,500 | A | 1/1995 | Schmidt |
| D370,988 | S | 6/1996 | Santarsiero |
| 5,567,115 | A | 10/1996 | Carbone |
| 5,570,949 | A | 11/1996 | Chiang |
| 5,571,279 | A | 11/1996 | Chiang |
| 6,004,004 | A | 12/1999 | Altman et al. |
| 6,280,050 | B1 | 8/2001 | Bird et al. |
| 6,612,695 | B2 | 9/2003 | Waters |
| 6,612,696 | B2 | 9/2003 | Waters |
| 6,659,618 | B2 | 12/2003 | Waters |

(Continued)

FOREIGN PATENT DOCUMENTS

| | | |
|---|---|---|
| CN | 201661949 U | 12/2010 |
| CN | 202056546 U | 11/2011 |

(Continued)

OTHER PUBLICATIONS

U.S. Appl. 29/889,102, filed Apr. 7, 2023, by Richardson et al. (Copy not submitted herewith pursuant to the waiver of 37 C.F. R. § 1.98(a)(2)(iii) issued by the Office on Oct. 19, 2004).

*Primary Examiner* — Arman B Fallahkhair
(74) *Attorney, Agent, or Firm* — Michael Best & Friedrich LLP

(57) ABSTRACT

A portable neck light includes a neck band having an arm extending to a distal end, the distal end defining a rotation axis. A light head is coupled to the distal end of the arm. A shaft is coupled to the light head and the neck band to allow rotation of the light head relative to the neck band about the rotation axis within a rotation plane. The light head is supported for continuous movement within an angular range of motion about the rotation axis.

8 Claims, 8 Drawing Sheets

(56) References Cited

U.S. PATENT DOCUMENTS

| | | | |
|---|---|---|---|
| 6,718,136 | B2 | 4/2004 | Bird et al. |
| 6,764,194 | B1 * | 7/2004 | Cooper ................. F21V 21/084 362/426 |
| 6,863,416 | B2 | 3/2005 | Waters |
| 7,104,670 | B2 | 9/2006 | Waters |
| 7,175,295 | B2 | 2/2007 | Bretz et al. |
| 7,240,883 | B2 * | 7/2007 | Liao .......................... F21L 4/00 248/278.1 |
| 7,377,664 | B2 | 5/2008 | Waters |
| D571,942 | S | 6/2008 | Christianson |
| 7,562,979 | B2 | 7/2009 | Waters |
| 7,661,818 | B2 | 2/2010 | Waters |
| D623,783 | S | 9/2010 | Christianson et al. |
| 8,152,330 | B2 | 4/2012 | Waters |
| 8,210,704 | B1 | 7/2012 | Parsons |
| 8,235,524 | B2 | 8/2012 | Waters |
| 8,388,164 | B2 | 3/2013 | Waters |
| 8,403,515 | B2 | 3/2013 | Eichelberger et al. |
| 8,444,266 | B2 | 5/2013 | Waters |
| 8,491,118 | B2 | 7/2013 | Waters |
| 8,545,012 | B2 | 10/2013 | Waters |
| 8,567,945 | B2 | 10/2013 | Waters |
| D699,875 | S | 2/2014 | Christianson et al. |
| 8,899,744 | B2 | 12/2014 | Waters |
| 8,979,295 | B2 | 3/2015 | Waters |
| 9,513,495 | B2 | 12/2016 | Waters |
| 9,526,292 | B2 | 12/2016 | Waters |
| 9,534,752 | B1 | 1/2017 | Mishan |
| 9,746,165 | B2 | 8/2017 | Ritter et al. |
| D804,070 | S | 11/2017 | Mishan |
| 9,885,465 | B2 | 2/2018 | Nguyen |
| D835,314 | S | 12/2018 | Sun |
| 10,405,597 | B2 | 9/2019 | Patel et al. |
| D871,257 | S | 12/2019 | Cacciabeve |
| D871,636 | S | 12/2019 | Cacciabeve |
| 10,634,330 | B1 | 4/2020 | Ferguson |
| 10,677,431 | B2 * | 6/2020 | Cacciabeve ......... F21V 21/0965 |
| D893,767 | S | 8/2020 | Hui |
| 10,900,647 | B2 | 1/2021 | Cacciabeve |
| 11,215,344 | B2 * | 1/2022 | Cacciabeve ........... F21V 21/145 |
| 11,333,335 | B2 * | 5/2022 | Cacciabeve ............. F21V 21/26 |
| 11,703,212 | B2 * | 7/2023 | Cacciabeve ........... F21V 21/145 362/108 |
| 11,766,111 | B2 * | 9/2023 | Yang ...................... G02B 7/182 359/872 |
| 2006/0176680 | A1 * | 8/2006 | Bretz ...................... F21V 21/32 362/108 |
| 2008/0192461 | A1 | 8/2008 | Chien |
| 2009/0116230 | A1 | 5/2009 | Young |
| 2013/0194784 | A1 | 8/2013 | Yu |
| 2016/0186965 | A1 | 6/2016 | Burns |
| 2017/0215983 | A1 | 8/2017 | Learn |
| 2020/0000168 | A1 | 1/2020 | Patel et al. |
| 2020/0109841 | A1 | 4/2020 | Cacciabeve |
| 2020/0109844 | A1 | 4/2020 | Ferguson |
| 2020/0408389 | A1 | 12/2020 | Cacciabeve |
| 2020/0408390 | A1 | 12/2020 | Cacciabeve |
| 2021/0108786 | A1 | 4/2021 | Cacciabeve |

FOREIGN PATENT DOCUMENTS

| | | | |
|---|---|---|---|
| CN | 203363701 | U | 12/2013 |
| CN | 104456101 | A | 3/2015 |
| CN | 105588018 | A | 5/2016 |
| CN | 105650506 | A | 6/2016 |
| CN | 106764575 | A | 5/2017 |
| CN | 107701955 | A | 2/2018 |
| CN | 211176364 | U | 8/2020 |
| JP | 3023009 | U | 4/1996 |
| JP | 2005243538 | A2 | 9/2005 |
| JP | 2017123224 | A | 7/2017 |
| JP | 2018181421 | A | 11/2018 |
| WO | 2018173612 | A1 | 9/2018 |

* cited by examiner

PORTABLE NECK LIGHT

CROSS REFERENCE TO RELATED APPLICATION(S)

The present application claims priority to U.S. Provisional Application Ser. No. 63/457,965, filed Apr. 7, 2023, the entire contents of which are incorporated herein.

FIELD OF THE INVENTION

The present invention relates to portable lights and, more particularly, to lights configured to hang on a user's neck to illuminate a working area.

BACKGROUND

Construction workers, mechanics, plumbers, etc. may use neck lights in order to see in low-light conditions while keeping their hands free.

SUMMARY

In one aspect, the disclosure provides a portable neck light including a neck band having an arm opening extending along a rotation axis, a light head including a shell opening aligned with the arm opening, and a shaft positioned within the arm opening and the shell opening and extending along the rotation axis. The shaft includes a first end coupled to the light head and a second end coupled to the neck band. An elastic pad is coupled to the neck band between the light head and the neck band and is disposed adjacent the shaft. The elastic pad engages the shaft to apply a frictional force to the shaft to inhibit rotation of the shaft relative to the elastic pad and support the light head in a plurality of positions with respect to the neck band.

In another aspect, the disclosure provides a portable neck light including a neck band having an arm extending to a distal end, the distal end defining a rotation axis. A light head is coupled to the distal end of the arm. A shaft is coupled to the light head and the neck band to allow rotation of the light head relative to the neck band about the rotation axis within a rotation plane. The light head is supported for continuous movement within an angular range of motion about the rotation axis.

In another aspect, the disclosure provides a portable neck light including a neck band a first light head and a second light head. The neck band includes a battery housing, a first arm extending from a first end of the battery housing, and a second arm extending from a second end of the battery housing. The first light head is coupled to the first arm by a first joint for rotation about a first rotation axis. The first light head is continuously rotatable about the first rotation axis relative to the first arm within a first range of motion. The first joint includes a first shaft coupled to the first light head and the first arm and a first elastic pad surrounding the first shaft and configured to apply a frictional force to the first shaft to maintain a position of the first light head within the first range of motion with respect to the first arm. The second light head is coupled to the second arm by a second joint for rotation about a second rotation axis. The second light head is continuously rotatable about the second rotation axis relative to the second arm within a second range of motion. The second joint includes a second shaft coupled to the second light head and the second arm and a second elastic pad surrounding the second shaft and configured to apply a frictional force to the second shaft to maintain a position of the second light head within the second range of motion with respect to the second arm. The first arm and the second arm can be flexed to change a distance between the first arm and the second arm.

Other features and aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-7 illustrates a portable neck light 10 according to one embodiment. The illustrated neck light 10 may be carried with a user and placed around the user's neck, allowing for hands-free illumination of a working area.

Figure 1:
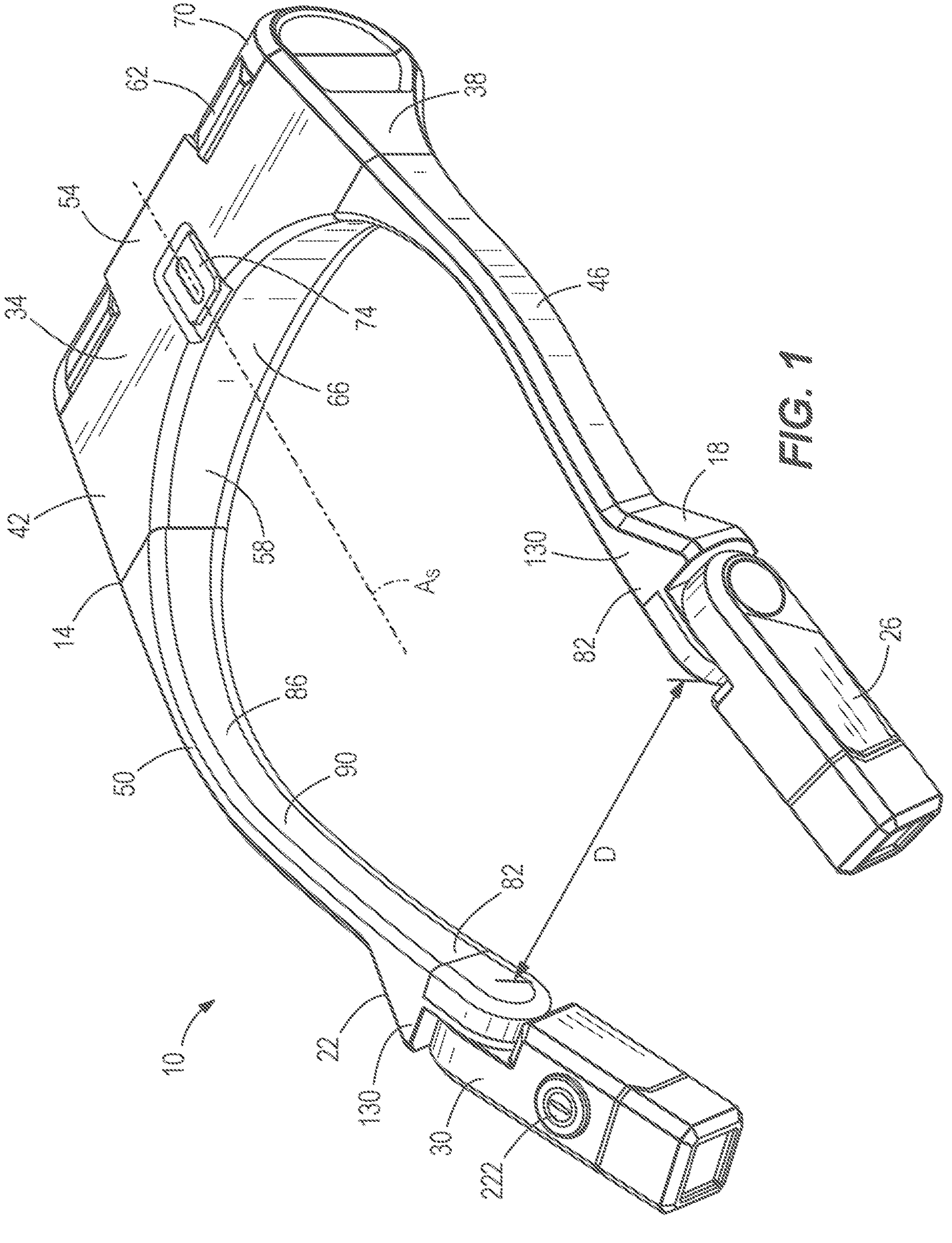
FIG. 1 is a front perspective view of a portable neck light according to one embodiment, the portable neck light including a neck band, a first light head, and a second light head.
Figure 2:
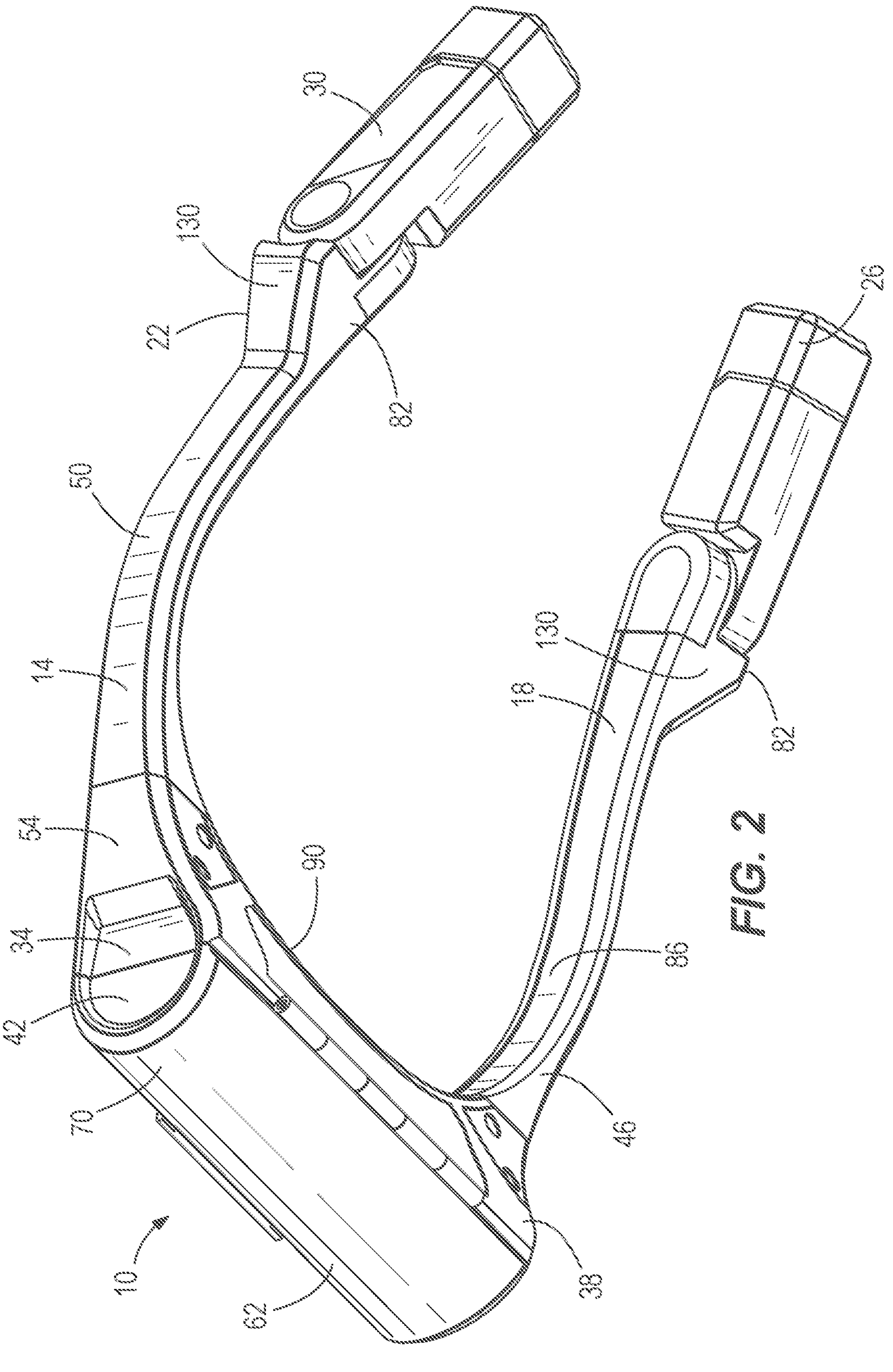
FIG. 2 is a rear perspective view of the portable neck light of FIG. 1.

Referring to FIGS. 1 and 2, the neck light 10 includes a neck band 14 that is generally U-shaped, a first light assembly 26 coupled to a first end 18 of the neck band 14 and a second light assembly 30 coupled to a second end 22 of the neck band 14. The neck band 14 includes a battery housing 34 positioned between the first end 18 and the second end 22, also referred to as the first band end 18 and the second band end 22 respectively. The battery housing 34 extends between a first housing end 38 and a second housing end 42. The neck band 14 further includes a first arm 46 coupled to the first housing end 38 of the battery housing 34 and a second arm 50 coupled to the second housing end 42 of the battery housing 34 forming the U-shape. The battery housing 34 includes a case 54 having a front side 58, also referred to herein as the inner side 58, and a rear side 62, also referred to herein as the outer side 62. The front side 58 includes an inner housing surface 66.

With reference specifically to FIG. 2, the battery housing 34 is configured to receive a battery (not shown). In some embodiments, the battery is removably received in the battery housing 34. The battery may include one or more standard cell batteries that are replaceable (e.g., an A, AA, or AAA battery, 9-volt battery, etc.). In some embodiments, the batteries may be rechargeable. In some embodiments, the battery may be a power tool battery pack, such as the REDLITHIUM® USB Battery sold by Milwaukee Tool. Finally, in some embodiments, the battery housing 34 may include an internal battery that is rechargeable within the battery housing 34. In the illustrated embodiment, the battery housing 34 includes a cover 70 hingedly coupled at the rear side 62 of the case 54. The cover 70 is movable between a closed position (shown) and an open position (not shown) to allow access inside the case 54. In some embodiments, the cover 70 provides access to the battery, for example to remove or to charge the battery. In the illustrated embodiment, the battery housing 34 additionally includes a connection port 74 (FIG. 1). The connection port 74 may be electrically connected to the battery, for example to supply power and recharge the battery. The connection port 74 may include a USB port or other suitable port.

As shown in FIGS. 1 and 2, the first arm 46 is connected to the front side 58 of the case 54 of the battery housing 34 adjacent the first housing end 38, and the second arm 50 is connected to the front side 58 of the case 54 adjacent the second housing end 42. In the illustrated embodiment, the first arm 46 and second arm 50 are coupled to the case 54 on either side of the inner housing surface 66. The neck light 10 is generally symmetrical across an axis of symmetry $A_S$ such that, except where otherwise noted, a first side mirrors a second side thereof. Throughout the description of the neck light 10, the description focuses on details of the first side, including the first arm 46 and the first light assembly 26. Unless otherwise noted, it can be assumed that the details of the second side, including the second arm 50 and the second light assembly 30, are generally the same as the first, but in mirror image.

With continued reference to FIGS. 1 and 2, each of the first arm 46 and second arm 50 extend to a distal end 82 and include an inner arm surface 86. In the illustrated embodiment, the distal end 82 of the first arm 46 forms the first end 18 of the neck band 14 and the distal end 82 of the second arm 50 forms the second end 22 of the neck band 14. When the first arm 46 and second arm 50 are coupled to the battery housing 34, the inner arm surfaces 86 and the inner housing surface 66 cooperate to form an inner contour 90. In the illustrated embodiment, the inner contour 90 is a continuous curve. The first light assembly 26, also referred to herein as the first light head 26, is pivotally coupled to the distal end 82 of the first arm 46. The second light assembly 30, also referred to herein as the second light head 30, is similarly pivotally coupled to the distal end 82 of the second arm 50. The first arm 46 and second arm 50 are both formed from resilient material and are capable moving between a rest position (FIG. 1) and flexed positions. In the illustrated embodiment, in the rest position, the first arm 46 and second arm 50 are slightly tilted inward relative to the axis of symmetry $A_S$ and tilted downward from the battery housing 34. The first end 18 of the neck band 14 and the second end 22 of the neck band 14 are spaced by a distance D. When a force is applied, the first arm 46 and the second arm 50 may deflect away from the rest position, changing the distance D between the first end 18 and the second end 22. In some embodiments, the first arm 46 and the second arm 50 may be driven to return to the rest position automatically by the resilience of the material of the neck band 14. In other embodiments, another force may be applied to return the first arm 46 and the second arm 50 to the rest position. The first arm 46 and second arm 50 may be moved different amounts relative to the axis of symmetry $A_S$ and may be moved in multiple directions. In some embodiments, the first arm 46 and second arm 50 are positionable (i.e., similar to wire) and may be formed by the user to specific shape and configuration.

Figure 3:
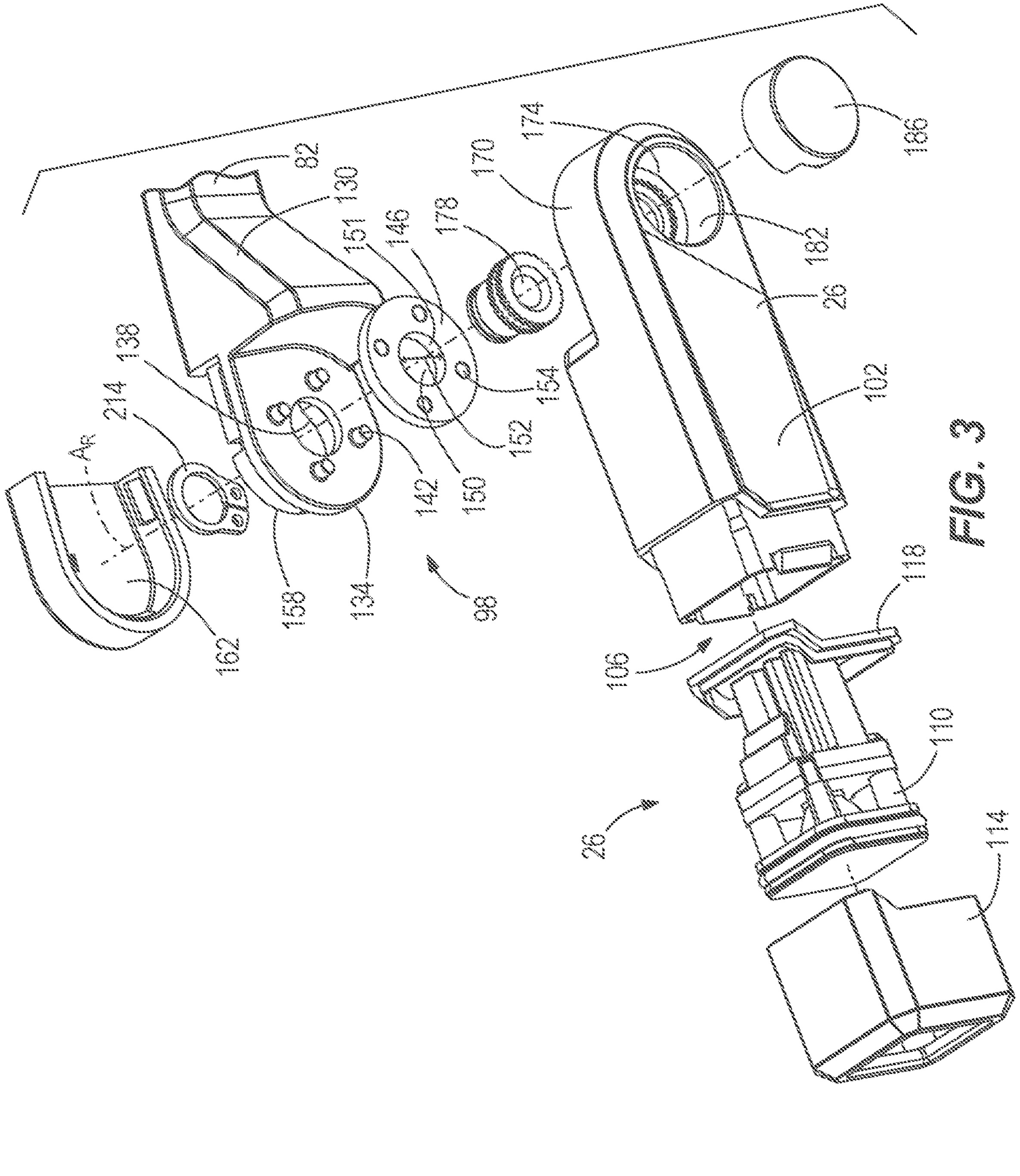
FIG. 3 is an exploded view of a joint between the first light head and the neck band of the portable neck light of FIG. 1.
Figure 7:
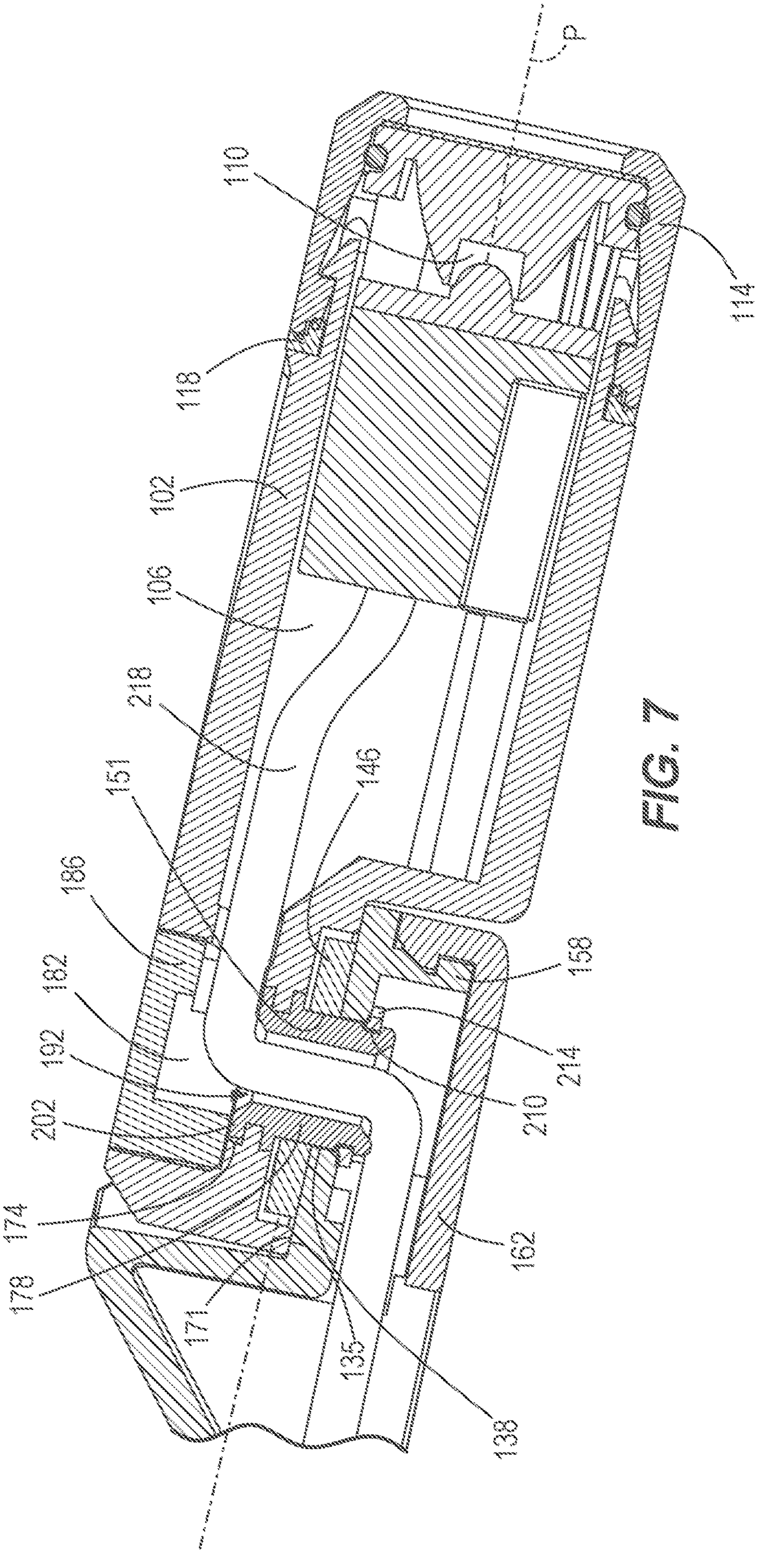
FIG. 7 is a cross-sectional view of the assembled joint of FIG. 3.

As shown in FIG. 3, the first light head 26 is coupled to the distal end 82 of the first arm 46 by a joint 98. The joint 98 supports the first light head 26 for movement with respect to the first arm 46 within a range of motion. In the illustrated embodiment, the first light head 26 is coupled to the first arm 46 for rotation about an axis of rotation $A_R$ within a rotation plane P (FIG. 7). In the illustrated embodiment, the first light head 26 is continuously movable within the range of motion to a plurality of positions (in contrast to being limited to a number of discrete positions within the range of motion). In other words, the first light head 26 is infinitely adjustable relative to the first arm 46 within the range of motion. For example, the first light head 26 may be pivotable within an angular range of motion of approximately 180 degrees about the axis $A_R$ relative to the first arm 46. In other embodiments, the first light head 26 may be pivotable through a larger or smaller range (e.g., 90 degrees, 210 degrees, 270 degrees, 360 degrees, 450 degrees, etc.). In the illustrated embodiment, the first light head 26 is limited to rotation about the axis of rotation $A_R$ only within the rotation plane P. That is, the first light head 26 can only move (e.g., rotate) about one degree of freedom.

The first light head 26 includes a shell housing 102 defining an interior cavity 106. A light module 110 is positioned within the interior cavity 106. A head cover 114 is coupled to the shell housing 102 to enclose the light module 110 within the interior cavity 106. The light module 110 may include various mechanical and electronic components for generating a light output including a lighting element, a lens, a reflector, and others. In some embodiments, the lighting element includes one or more LEDs that emit light. A gasket 118 may be positioned between the head cover 114 and the shell housing 102 to inhibit moisture and other debris from entering the interior cavity 106.

Figure 4:
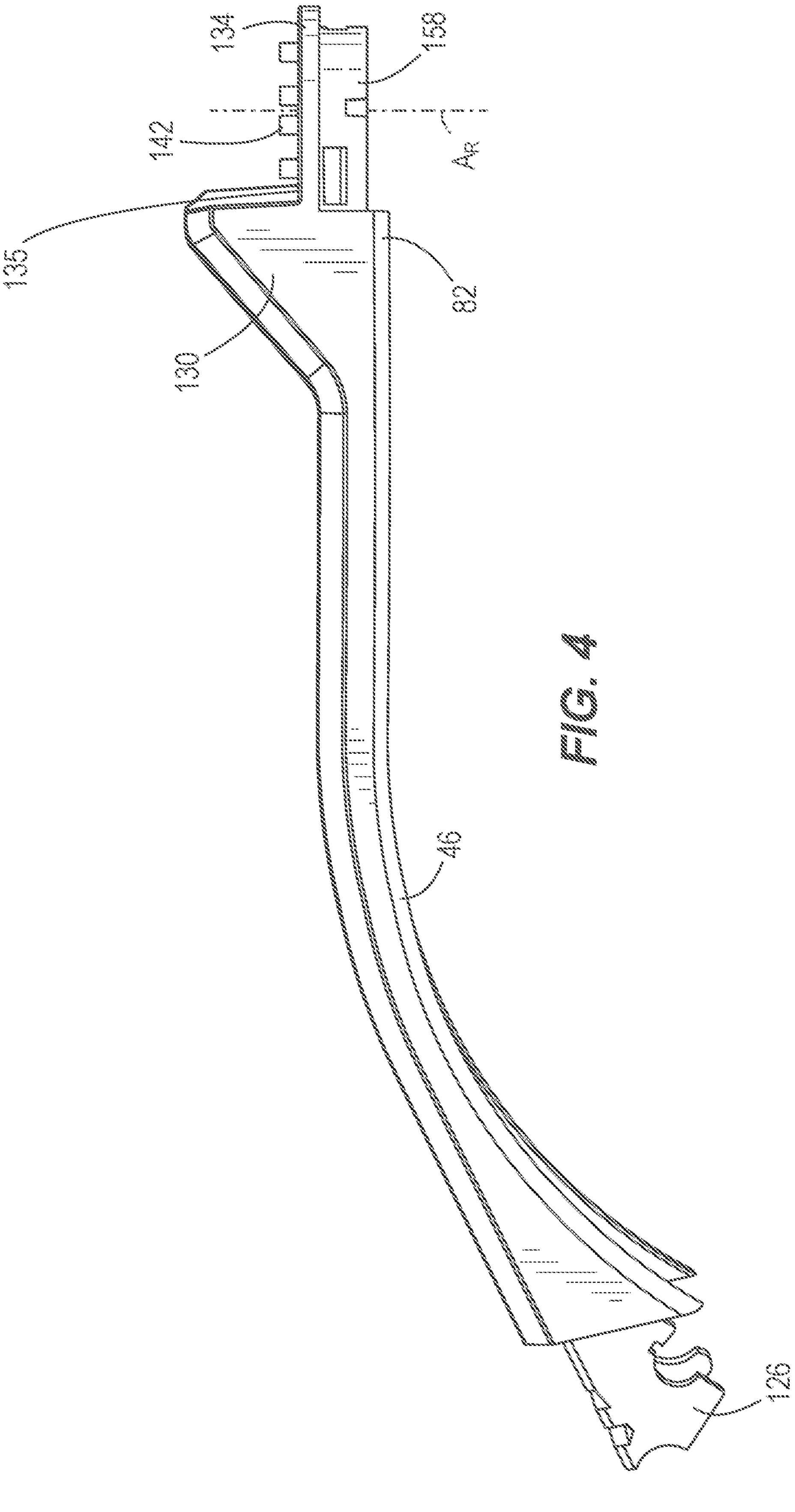
FIG. 4 is a side view of an arm of the neck band of FIG. 1.

With reference to FIG. 4, the first arm 46 includes a connection end 126 opposite the distal end 82. The connection end 126 includes engaging features for coupling to the battery housing 34. In the illustrated embodiment, the engaging features include shaped hooks that snap into a corresponding opening on the battery housing 34. In other embodiments, the first arm 46 may be coupled to the battery housing 34 in other ways. The first arm 46 includes a wider portion 130 adjacent the distal end 82. The wider portion 130 tapers outwardly (i.e., away from the axis of symmetry $A_S$) as the first arm 46 extends toward the distal end 82. A plate 134 extends from the wider portion 130. The plate 134 includes an arm opening 138 (FIG. 3) that extends along the axis of rotation $A_R$. The plate 134 includes a set of posts 142 adjacent the arm opening 138 that extend outwardly from an outer surface 135 of the plate 134. In the illustrated embodiment, the set of posts 142 are generally cylindrical and positioned circumferentially about the arm opening 138. In other embodiments, the posts 142 may be otherwise shaped or positioned on the plate 134. The plate 134 of the first arm 46 further includes a set of connection features 158 coupled to the inner surface of the plate 134, opposite the set of posts 142. The set of connection features 158 couples to a shaft cover 162 (FIG. 3). In the illustrated embodiment, the set of connection features 158 includes openings configured to receive snap cams positioned on the shaft cover 162. In other embodiments, other methods of coupling the shaft cover 162 to the plate 134 of the first arm 46 may be implemented.

Returning to FIG. 3, the joint 98 includes an elastic pad 146 coupled to the plate 134 of the neck band 14. The elastic pad 146 may be made of a rubber or elastomeric material. In the illustrated embodiment, the elastic pad 146 is an annular pad having a central pad opening 150 with a contact surface 151 on the inner rim thereof. When assembled, the contact surface 151 is disposed adjacent the arm opening 138. In other embodiments, the elastic pad 146 may include one or more smaller pads arranged on the plate 134 and having contact surfaces 151 adjacent the arm opening 138. The central pad opening 150 includes an inner diameter 152. In the illustrated embodiment, the elastic pad 146 is coupled to the plate 134 by a set of peripheral openings 154. The peripheral openings 154 correspond to the set of posts 142 and are shaped and arranged relative to the central pad opening 150 in a way that corresponds to the set of posts 142 arranged around the arm opening 138. The set of posts 142 and peripheral openings 154 therefore act as an alignment feature to align the elastic pad 146 such that, when assembled, the central pad opening 150 aligns with the arm opening 138 and the axis of rotation $A_R$. The elastic pad 146 is inhibited from rotating with respect to the plate 134 and thus is coupled to the plate 134 for corotation therewith. In some embodiments, the peripheral openings 154 may be slightly smaller than the set of posts 142 so that the elastic pad 146 is press fit onto the plate 134 and is secured against translating relative to the arm 46. In some embodiments, the elastic pad 146 is free to translate slightly along the posts 142 of the plate 134.

Figure 6:
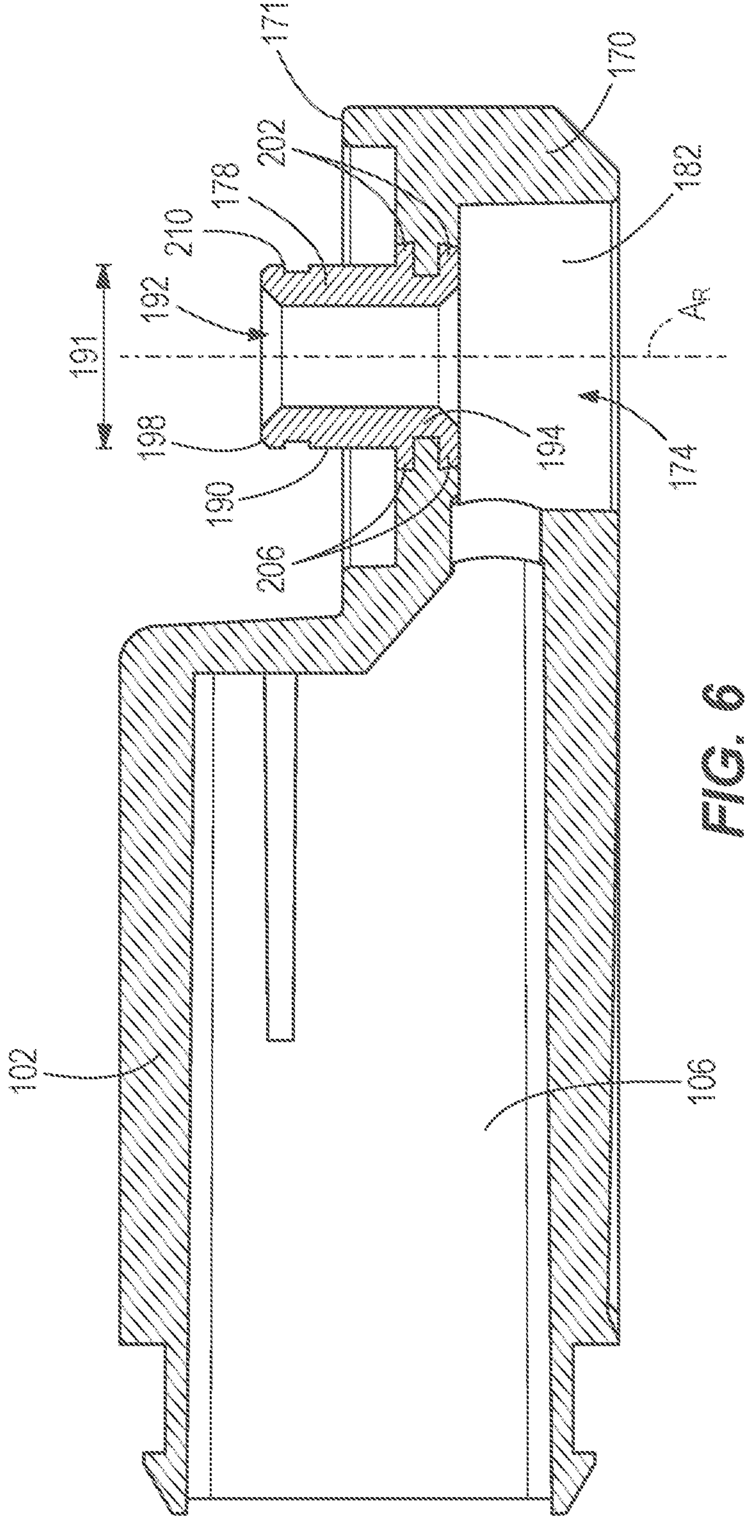
FIG. 6 is a cross-sectional view of a housing of the first light head and the rotation shaft of the joint of FIG. 3.

With continued reference to FIG. 3, the shell housing 102 includes a protrusion 170 that extends rearwardly, opposite the direction of illumination. The protrusion 170 includes a shell opening 174 that extends through the protrusion 170 along the axis $A_R$ to an inner surface 171 (FIG. 6). In the illustrated embodiment, the axis of rotation $A_R$ is approximately perpendicular to the direction of illumination. In other words, the direction of illumination is approximately in the rotation plane P (FIG. 7). In other embodiments, the protrusion 170 and shell opening 174 may be otherwise configured. The shell opening 174 may include a counter bore 182 that removably receives a plug 186 to protect the joint 98. In some embodiments, the plug 186 may be selectively removed to access the joint 98 or the electronics within the first light head 26.

Figure 5:
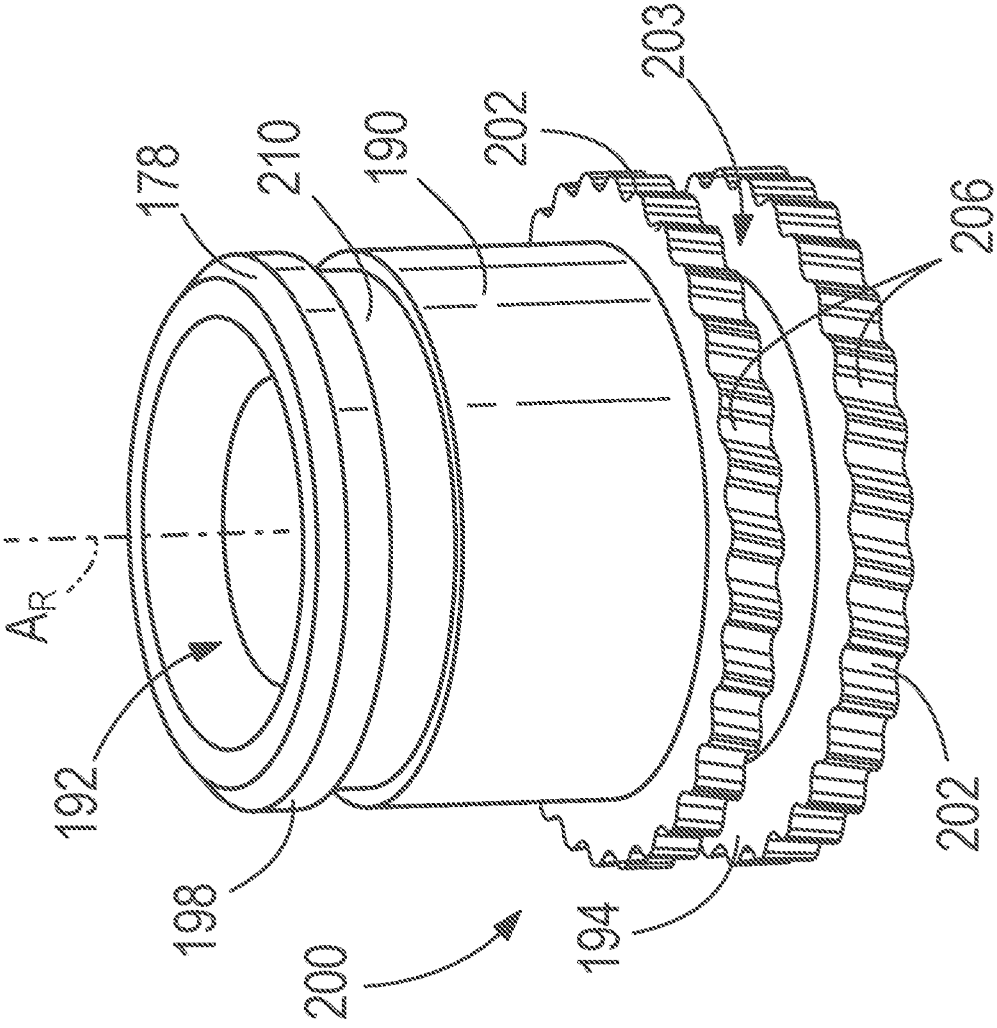
FIG. 5 is a perspective view of a rotation shaft of the joint of FIG. 3.

Turning now to FIGS. 5 and 6, a rotation shaft 178 is fixed to the shell housing 102 and is positioned in the shell opening 174. The rotation shaft 178, also referred to as simply the shaft 178, includes a circumferential wall 190 surrounding a channel 192 extending along the rotation axis $A_R$. The circumferential wall 190 extends to an outer diameter 191. The shaft 178 extends along the rotation axis $A_R$ between a first shaft end 194 and a second shaft end 198. The first shaft end 194 includes a coupling interface 200 that engages the shell housing 102 to couple the shaft 178 to the shell housing 102. The second shaft end 198 of the shaft 178 couples the shaft 178 to the neck band 14.

In the illustrated embodiment, the coupling interface 200 includes a pair of flanges 202 extending radially outward relative to the axis $A_R$. Each flange 202 includes an outer rim 206 that includes a textured surface. In the illustrated embodiment the outer rim 206 of each flange 202 is twill knurled and include grooves that spiral with respect to the axis $A_R$. In other embodiments, other textures may be used. In still other embodiments, the outer rims 206 may instead have a noncircular outer profile that is constant with respect to the axis AR, such as a geared profile, toothed profile, square profile, etc. With reference specifically to FIG. 6, in the illustrated embodiment, the shaft 178 is permanently fixed to the shell housing 102 by the coupling interface 200. The shell housing 102 is formed of a plastic material which is injection molded to surround the shaft 178. The shaft 178 may be formed from brass or another bearing material. The pair of flanges 202 are separated by a gap 203 (FIG. 5). When the shell housing 102 is formed, material fills the gap 203 creating a ridge within the shell opening 174. The ridge is sandwiched between the flanges 202 to couple the shaft 178 to the first light head 26 for translation in any direction, but especially along the axis of rotation $A_R$. The injected material of the shell housing 102 is also molded against the outer rims 206 and engage the textured or noncircular surfaces thereof to create an inverse profile that inhibits rotation of the shell housing 102 relative to the flanges 202 and couples the first light head 26 for rotation with the shaft 178. In other embodiments, the shell housing 102 may be formed separate from the shaft 178 but still include a textured rib inverse of the flanges 202 to engage the coupling interface 200 of the shaft 178 and rotatably secure the first light head 26 and the shaft 178. In other embodiments, the coupling interface 200 may be formed differently.

Figure 8:
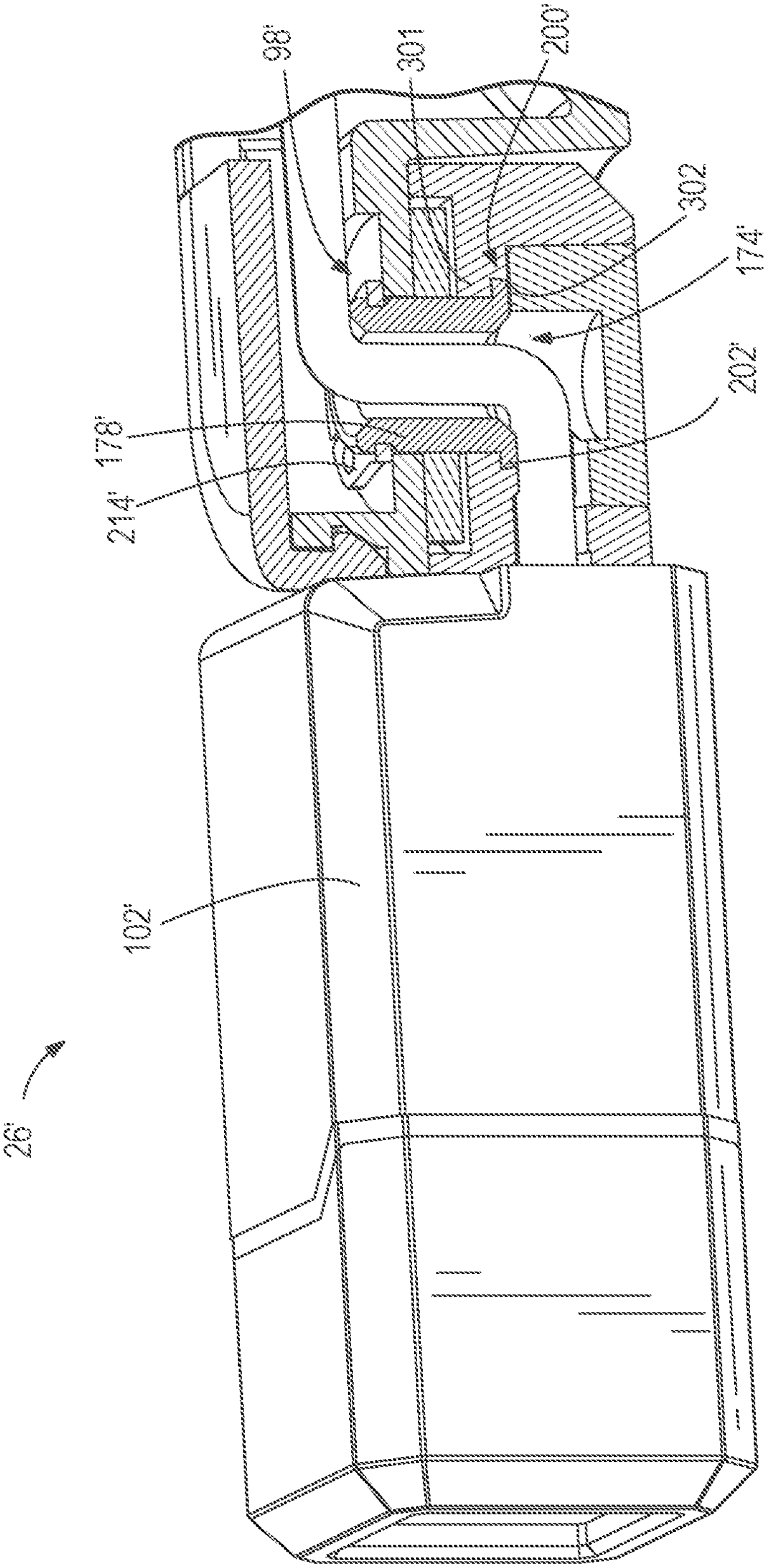
FIG. 8 is a section view of an alternate embodiment of a joint between the light head and the neck band of the portable neck light of FIG. 1.

One exemplary embodiment, shown in FIG. 8, includes an alternate joint 98' that includes a shaft 178' have a coupling interface 200' with a single flange 202' having a non-circular outer profile. The flange 202' engages the shell opening 174' of the shell housing 102'. The shell opening 174' may include a wall 301 having a recess 302 with a corresponding profile to the flange 202' to rotatably couple the shaft 178' to the light head 26'. The flange 202' is held in the recess 302 by the clip 214' that engages the shaft 178'. In embodiments such as the one illustrated in FIG. 8, the shaft 178' may be a removable component and may be assembled along with the alternate joint 98'. Still further configurations of coupling interfaces may be used to rotatably couple the first light head 26 to the shaft 178.

Turning to FIG. 7, to assemble the first light head 26 of the neck light 10, the light module 110 is positioned within the interior cavity 106. The gasket 118 is positioned around an end of the shell housing 102, and the head cover 114 is coupled to the end of the shell housing 102 to enclose and fluidly isolate the light module 110. The shaft 178 is coupled to the shell housing 102 of the first light head 26 (e.g., embedded during injection molding) so the first shaft end 194 is positioned within the shell opening 174. The flanges 202 engage the shell housing 102 to secure the rotation shaft to rotate and translate with the shell housing 102. The first light head 26 is coupled to the neck band 14 by assembling the joint 98.

To assemble the joint, the elastic pad 146 is coupled to the plate 134 by fitting the peripheral openings 154 over the posts 142 which aligns the central pad opening 150 with the arm opening 138. The first light head 26 is positioned with the projection adjacent the plate 134 so the shaft 178 extends along the rotation axis $A_R$. The first light head 26 is moved inwardly along the rotation axis $A_R$ toward the plate 134 so the second shaft end 198 extends through the central pad opening 150 and through the arm opening 138 and is disposed on a side of the plate 134 opposite the first light head 26. A coupling member 214 engages the second shaft end 198 of the shaft 178 to inhibit the first light head 26 from disassembling from the arm 46. In the illustrated embodiment, the coupling member 214 includes a clip or snap ring that engages a groove 210 (FIG. 5) scribed into the circumferential wall 190. The snap ring 214 has a diameter wider than the arm opening 138 so that the shaft 178 (and thereby the first light head 26) is inhibited from translating along the axis $A_R$. In other embodiments, other coupling methods may be used. The shaft 178 is thereby supported for rotation within the arm opening 138 about the axis $A_R$.

As the shaft 178 moves along the rotation axis $A_R$, the contact surface 151 of the clastic member 146 engages the outer surface of the circumferential wall 190 of the shaft 178. In the illustrated embodiment, the inner diameter 152 of the central pad opening 150 is smaller than the outer diameter 191 of the circumferential wall 190. Thus, the contact surface 151 is radially displaced by the shaft 178. The natural resilience of the elastic material (e.g., rubber) of the elastic pad 146 drives the contact surface 151 toward the axis $A_R$, and therefore applies a radial holding force or frictional force on the shaft 178. Additionally, once the coupling member 214 is secured to the shaft 178, the shell housing 102 is held relative to the arm 46 such that at least one surface of the light head 26 (e.g., the inner surface 171 of the protrusion 170) abuts at least one surface of the first arm 46 (e.g., the outer surface 135 of the plate 134) and a secondary friction force is applied to the light head 26. The combined force maintains the rotational position of the shaft 178 relative to the elastic pad 146 and by extension the position of the first light head 26 relative to the neck band 14. The shaft 178 is held against rotation about the axis $A_R$ unless the frictional force is overcome by the user. In some embodiments, the force required to rotate the first light head 26 about the arm 46 is between 0.2 and 0.6 lbf. In the illustrated embodiment, the contact surface 151 is annular and applies the radial friction force evenly around the circumference of the shaft 178. In other embodiments, the force may be distributed differently. In some embodiments, lubrication may be applied to the contact surface 151 to ensure smooth rotation. When the holding force is overcome, the contact surface 151 of the elastic pad 146 slides along the outer surface of the circumferential wall 190 as the shaft 178 rotates with respect to the plate 134. The joint 98 therefore pivotally couples the first light head 26 for pivoting movement within a range of motion about the rotation axis. While not discussed herein, it is understood that the joint 98 may include one or more stop members to define the range of motion and or components that otherwise limit rotation of the shaft 178 to within the range of motion. The joint 98 allows for exceptionally smooth rotation of the first light head 26 relative to the arm 46, as well as precise positioning of the first light head 26, and the associated light output.

When the first light head 26 is coupled to the first arm 46, an outer edge of the shell housing 102 may generally align with the outer side of the wider portion 130 on the arm 46, creating an outer contour that protects the first light head 26. The joint 98 supports the first light head 26 on the arm 46 so that the first light head 26 can rotate about the axis AR relative to the arm 46. The first light head 26 may be electrically coupled to the battery in the battery housing 34 through the joint 98. A wire 218 extends through the channel 192, also referred to as the wire channel 192, of the shaft 178. The wire 218 may electrically connect the battery to the light module 110 to provide power for and control of the light output. The wire 218 may rotate within the channel 192 to prevent damage to the wire. The shaft cover 162 is coupled to the connection features 158 of the arm 46 to enclose the wire 218 and protect the joint 98. Similarly, the plug 186 may be fit within the counter bore 182 of the shell opening 174 to enclose the wire 218 and protect the joint 98. In some embodiments, the plug 186 may be removable at a later time.

As discussed above, the second light head 30 is similarly coupled to the second arm 50 by a joint 98. In some embodiments, the second light head 30 may additionally include a control element, such as user control button 222 (FIG. 1). In the illustrated embodiment, the user control button 222 is not mirrored on the first light head 26. The second light head 30 may also include a PCB for controlling the light modules in the first light head 26 and the second light head 30. In some embodiments, the first light head 26 may also include a control element, or the control elements and electronics may be positioned elsewhere on the neck light 10 (e.g., on the battery housing 34).

To operate the neck light 10, the neck light 10 can be positioned around the neck of the user. The distance D between the first end 18 and the second end 22 of the neck band 14 in the rest position may be smaller than the width of the user's neck. The user may apply a separating force to the first arm 46 and/or the second arm 50 to increase the distance D between the first end 18 and the second end 22 until the distance D is equal to or greater than the width of the user's neck and to allow the neck to be received within the inner contour 90. The neck light 10 is positioned with the battery housing 34 at the base (or nape) of the user's neck. The battery housing 34 tends to be the heaviest portion of neck lights, therefore, it is advantageous to position the battery housing 34 closest to the user's neck to provide the most ergonomic support. Once the user's neck has been received within the inner contour 90 of the neck band 14, the first arm 46 and second arm 50 may return to the rest position. In some embodiments, the first arm 46 and the second arm 50 are driven to return by the inherent resilience thereof. In some embodiments, the user manually returns the first arm 46 and the second arm 50. Because the distance D in the rest position is smaller than the width of the user's neck, the likelihood of the neck light 10 falling off of the user's neck is decreased.

The light heads 26, 30 may be operated by pressing the user button 222 on the second light head 30. In the illustrated embodiment, both the first light head 26 and the second light head 30 are controlled by the single user button. For example, by subsequent presses of the button 222, the neck light 10 may toggle between illuminating the first light head 26, the second light head 30, and both of the light heads 26, 30. Additionally or alternately, subsequent presses of the button 222 may activate different modes of the light heads 26, 30 (e.g., OFF, HI, LO, PULSE, RED, etc.). In other embodiments, both the first light head 26 and the second light head 30 may include a dedicated button, and the light heads 26, 30 may be separately controlled. Additionally, in some embodiments, the battery housing 34 itself may include user control components that operate alternatively or in conjunction with the user buttons on the light heads 26, 30.

Once the desired light output is achieved, the light heads 26, 30 can be gripped by the user and pivoted to any of a plurality of positions within the range of motion. The light heads 26, 30 are able to be supported for continuous movement through the range of motion and the joint 98 is capable of holding the light heads 26, 30 at any position. The force of the elastic pad 146 on the shaft 178 and friction between the light heads 26, 30 and respective arms 46, 50 retains the light heads 26, 30 in place when the user releases the light heads 26, 30. The user is therefore able to direct light toward an area or task and provide hands free illumination.

Various features of the invention are set forth in the following claims.

What is claimed is:

1. A portable neck light comprising: a neck band including an arm opening extending through the neck band along a rotation axis; a light head including a shell opening aligned with the arm opening; a shaft positioned within the arm opening and the shell opening and extending along the rotation axis, the shaft including a first end coupled to the light head and a second end coupled to the neck band; and an elastic pad coupled to the neck band between the light head and the neck band and disposed adjacent the shaft, the elastic pad engaging the shaft to apply a frictional force to the shaft to inhibit rotation of the shaft relative to the elastic pad and support the light head in a plurality of positions with respect to the neck band; wherein the arm opening extends along the rotation axis through a plate extending from a distal end of the neck band, wherein the elastic pad is annular and includes a pad opening, and the elastic pad is coupled to the plate with the pad opening and the arm opening aligned along the rotation axis, wherein the shaft extends through the pad opening, and an inner surface of the pad opening engages an outer surface of the shaft to apply the frictional force that maintains a rotational position of the light head relative to the neck band; and wherein the plate includes a set of posts and the elastic pad includes a set of openings configured to engage the set of posts to secure the elastic pad to the plate for corotation with the neck band.

2. The portable neck light of claim 1, further comprising a coupling member that engages the second end of the shaft to secure the shaft against translation along the rotation axis relative to the neck band.

3. The portable neck light of claim 2, wherein the coupling member includes a clip that engages a groove disposed on the second end of the shaft, and wherein the clip is wider than the arm opening and holds the shaft relative to the neck band.

4. The portable neck light of claim 1, wherein a surface of the light head abuts a surface of the neck band to apply a secondary friction force that helps support the light head in the plurality of positions with respect to the neck band.

5. The portable neck light of claim 1, wherein the light head is plastic, the shaft is brass, and the elastic pad is rubber.

6. The portable neck light of claim 1, wherein the light head is continuously rotatable about the rotation axis between the plurality of positions within a range of motion.

7. The portable neck light of claim 1, wherein the neck band extends between a first band end and a second band end, wherein the light head is a first light head coupled to the first band end, and the portable neck light further comprises a second light head coupled to the second band end of the neck band.

8. A portable neck light comprising:

a neck band including a battery housing, a first arm extending from a first end of the battery housing and having a first plate with a first set of posts, and a second arm extending from a second end of the battery housing and having a second plate with a second set of posts;

a first light head coupled to the first arm by a first joint for rotation about a first rotation axis, the first light head being continuously rotatable about the first rotation axis relative to the first arm within a first range of motion, the first joint including

- a first shaft coupled to the first light head and the first arm,
- a first elastic pad surrounding the first shaft and configured to apply a frictional force to the first shaft to maintain a position of the first light head within the first range of motion with respect to the first arm, the first elastic pad including a first set of openings configured to engage the first set of posts to secure the first elastic pad to the first plate for corotation with the neck band, and
- a first clip that engages a first groove disposed on the first shaft to secure the first shaft against translation along the first rotation axis relative to the neck band; and a second light head coupled to the second arm by a second joint for rotation about a second rotation axis, the second light head being continuously rotatable about the second rotation axis relative to the second arm within a second range of motion, the second joint including

- a second shaft coupled to the second light head and the second arm, and
- a second elastic pad surrounding the second shaft and configured to apply a frictional force to the second shaft to maintain a position of the second light head within the second range of motion with respect to the second arm, the second elastic pad including a second set of openings configured to engage the second set of posts to secure the second elastic pad to the second plate for corotation with the neck band, and
- a second clip that engages a second groove disposed on the second shaft to secure the second shaft against translation along the second rotation axis relative to the neck band;

wherein the first arm and the second arm can be flexed to change a distance between the first arm and the second arm.

* * * * *